UNITED STATES PATENT OFFICE 2,094,580

TRICARBOCYANINES AND PROCESS OF PREPARING THEM

Leslie G. S. Brooker, Rochester, N. Y., assignor, by mesne assignments, to Eastman Kodak Company, Jersey City, N. J., a corporation of New Jersey No Drawing. Application January 16, 1933, Serial No. 652,030

19 Claims. (Cl. 260—44)

This invention relates to an improved method for the preparation of cyanine dyes of what is known as the tricarbocyanine series. These dyes are characterized by the possession of a heptamethine chain which serves to link the two heterocyclic nuclei together.

In my copending application Serial No. 651,870 of even date, I have described the "strong organic base" method. It is an object of the present invention to provide another method of preparing these same dyes. Other objects will hereinafter appear.

If an alkyl quaternary salt of a heterocyclic base containing a reactive methyl group is treated under appropriate conditions with a 2-iodopyridine alkyl iodide or a 2-iodoquinoline alkyl iodide in the presence of pyridine, the tricarbocyanine dye corresponding to the alkyl quaternary salt used is formed. Thus 1-methylbenzothiazole ethiodide treated with 2-iodoquinoline ethiodide in the presence of pyridine gives rise to 2,2'-diethylthiotricarbocyanine iodide

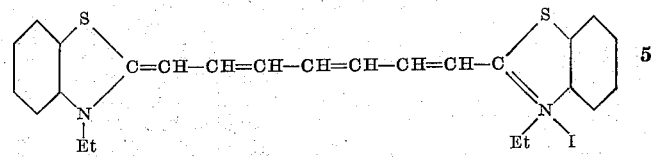

and the same dye is obtained when 1-methylbenzothiazole etho-p-toluenesulfonate is treated with 2-iodopyridine ethiodide in the presence of pyridine. Similarly, 1-methyl- α-naphthothiazole etho-p-toluenesulfonate gives rise to 2,2'-diethyl-5,6,5',6'-dibenzothiotricarbocyanine iodide.

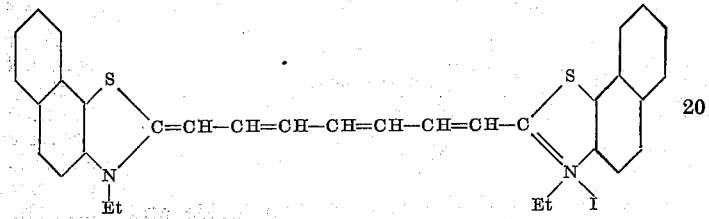

1-methylbenzoselenazole ethiodide likewise gives 2,2'-diethylselenotricarbocyanine iodide

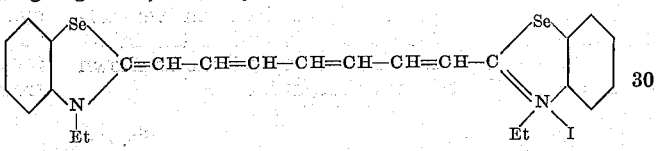

and 2-methylthiazoline methiodide treated with 2-iodo pyridine ethiodide in the presence of pyridine gives 3,3'-dimethylthiazolinotricarbocyanine iodide

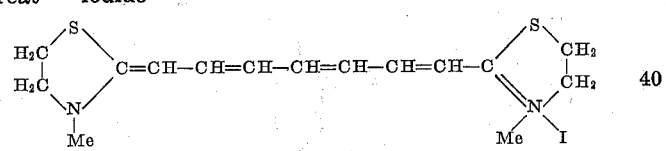

Also, when 1-ethylbenzothiazole ethiodide is treated with 2-iodopyridine ethiodide in the presence of pyridine there is formed the dye 7,13-dimethyl-2,2' - diethylthiotricarbocyanine iodide

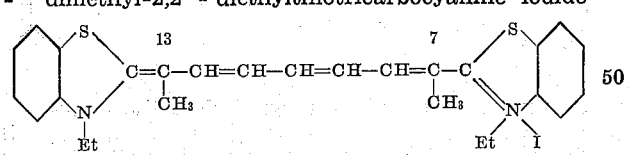

The general reaction takes place as follows. Equimolecular proportions of 2-iodoquinoline alkyl iodides and pyridine first combine to give intermediate compounds of a new type, probably represented by the formula

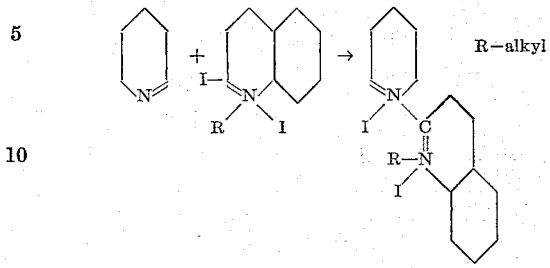

(2-quinolyl alkyl iodide)-pyridinium iodide.

These intermediate compounds can be isolated by treating the finely pulverized 2-iodoquinoline alkyl iodides with pyridine, preferably in the cold, for 12 to 24 hours, and are then obtained as orange colored solids which can be purified by very rapid recrystallization from water. It is convenient to employ a large excess of pyridine. The new compounds are unstable towards recrystallization but are quite soluble in hot water whereas the 2-iodoquinoline alkyl iodides are only sparingly soluble. (2-quinolyl methiodide)-pyridinium iodide is obtained as orange-ochre crystals on recrystallization from water and melts at 170–171° C. (with decomp.) (corr.). The corresponding ethiodide melts at 167–168° (with decomp.) (corr.).

The 2-iodopyridine alkyl iodides likewise give rise to the corresponding compounds

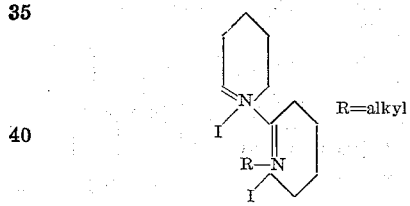

(2-pyridyl alkyl iodide)-pyridinium iodide and these compounds are yellow solids.

In the preparation of the tricarbocyanines dye formation probably takes place between two molecules of quaternary salt and one of the intermediate compound and two of pyridine as shown below for the thiotricarbocyanine

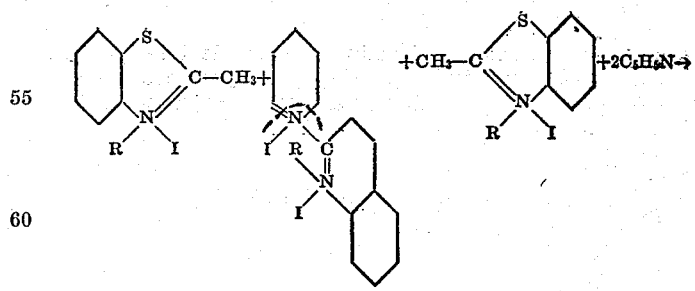

It is not necessary however to isolate the intermediate compound, this being formed during the course of the reaction and subsequently decomposed.

The pyridinium ring undergoes fission in the position shown by the dotted line and a secondary product of the reaction is probably 2-aminoquinoline alkyl iodide, but a description of the exact course of the reaction is not essential for the present purpose.

A precisely similar scheme may be formulated for the condensation where 2-iodopyridine alkyl iodide is used, and in this case 2-aminopyridine alkyl iodide is probably a by-product, as well as pyridine hydroiodide.

It is seen that the quinoline residue from the 2-iodoquinoline alkyl iodide does not enter the molecule of the dye formed and the same applies, of course, to the pyridine residue of the 2-iodopyridine alkyl iodide.

It is convenient to carry out the condensations either in the cold, at room temperature, or with a certain amount of heating, but too much heating must be avoided as the tricarbocyanine dyes are not very stable and rapid decomposition sets in at elevated temperatures. It is also convenient to use the pyridine in excess of the amount actually required for the reaction; the excess then serves as solvent. It is also advisable to employ the 2-iodoquinoline (or pyridine) alkyl iodide in a finely divided state, so that the reaction can proceed as far as possible to completion.

The foregoing methods of procedure and the reactions involved are illustrated by the following examples, although it will be understood that I am to be limited only by the claims appended hereto.

EXAMPLE 1

*2,2'-diethylthiotricarbocyanine iodide*

3.5 parts (2 mols) of 1-methylbenzothiazole etho-p-toluenesulfonate and 2.05 parts (1 mol.) of finely powdered 2-iodoquinoline ethiodide and 30 parts of anhydrous pyridine are heated together with constant shaking on a steam bath for about one and one-half minutes. The liquid becomes dark green and heating is discontinued and the whole is stood aside to cool (ten minutes) and the dye is then precipitated by the addition of excess of ice water (100 parts). The dye is removed, washed with water and then acetone. The dye forms greenish crystals and gives a deep blue solution in methyl alcohol, from which it may be recrystallized.

The same dye results when 1-methylbenzothiazole ethiodide is employed as the quaternary salt.

An alternative method of preparation is as follows. 3.5 parts (2 mols) of 1-methylbenzothiazole etho-p-toluenesulfonate, 1.8 g. (1 mol.) of 2-iodopyridine ethiodide and 22 parts of pyridine are well mixed and allowed to stand for 36 hours at room temperature with occasional shaking. At the end of this period the dye is removed by filtration and may be purified as described above. The reaction mixture may also be allowed to stand at about 4° C. for eight days and the dye then filtered off and purified.

Example 2

7,13-dimethyl-2,2'-diethylthiotricarbocyanine iodide 3.2 parts (2 mols) of 1-ethylbenzothiazole ethiodide, 1.8 parts (1 mol.) of 2-iodopyridine ethiodide and 20 parts of pyridine are heated together on a steam bath for about 1½ minutes with constant shaking. The liquid becomes inky in color and is then allowed to cool over about 20 minutes and the dye is then precipitated as a coppery colored tar by adding excess of ice water. The aqueous liquors are decanted off and the residue washed with more water and then crystallization is induced by stirring with hot acetone. The dye is removed and crystallized from hot methyl alcohol when it is obtained in minute green crystals which give a deep blue solution in the solvent.

Example 3

2,2'-diethyl-5,6,5',6'-dibenzothiotricarbocyanine iodide 4 parts (2 mols) of 1-methyl-α-naphthothiazole etho-p-toluenesulfonate, 1.8 parts (1 mol.) of 2-iodopyridine ethiodide and 20 parts of pyridine are heated together on a steam bath with shaking for a short period, about 1½ minutes. The mixture becomes dark green. It is then removed and allowed to cool somewhat with shaking and then ice and water are added to throw the dye out of solution. The dye separates in minute coppery crystals and is removed after standing for a short while, washed with water and cold acetone and finally with cold methyl alcohol. The dye forms a brown crystalline powder and may be recrystallized from methyl alcohol when it is obtained in a dull bronze felted mass after filtration. The solution in methyl alcohol is green.

If 2-iodoquinoline ethiodide is used in place of the 2-iodopyridine ethiodide used above, 2.05 parts (1 mol.) are required and the reaction is carried out in a precisely similar fashion.

Example 4

2,2'-diethylselenotricarbocyanine iodide 3.5 parts (2 mols) of 1-methylbenzoselenazole ethiodide, 1.8 parts (1 mol.) of 2-iodopyridine ethiodide and 20 parts of pyridine are heated on a steam bath with constant agitation for about 1½ minutes during which time the mixture becomes quite hot and assumes a dull green color. The mixture is allowed to cool for a few minutes and the dye is precipitated by the addition of excess of ice water. The dye is then removed and washed with water followed by a little acetone. It is then obtained as a dark green powder which gives a deep blue solution in methyl alcohol, from which solvent it may be recrystallized.

Example 5

3,3'-dimethylthiazolinotricarbocyanine iodide 2 parts of 2-methylthiazoline are heated at 100° C. for 20 minutes with 3.7 parts of methyl p-toluenesulfonate to produce 2-methylthiazoline metho-p-toluenesulfonate (2 mols.). This salt is dissolved in 25 parts of pyridine, the solution cooled and 3.6 parts (1 mol.) of 2-iodopyridine ethiodide added and the mixture kept at room temperature for 5 days with occasional shaking. The dye is then thrown out of solution by adding much ice water and is removed by filtration. It may be recrystallized from methyl alcohol in which it gives an intense blue solution and is obtained in blue grey crystals.

What I claim as my invention and desire to be secured by Letters Patent of the United States is:

1. A process for the preparation of a tricarbocyanine salt which comprises reacting together two molecules of a quaternary salt of the following structure:

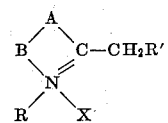

wherein R represents an alkyl group, R' represents a substituent selected from the group consisting of a hydrogen atom and an alkyl group, A represents an atom selected from the group consisting of sulfur and selenium, B represents a radical selected from the group consisting of an ethylene, a phenylene and a naphthylene, and X represents an acid radical, with pyridine in the presence of a quarternary salt of the following structure:

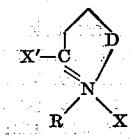

wherein R represents an alkyl group and D represents a radical selected from the group consisting of a vinylene and a phenylene and X and X' represent halogen atoms.

2. A process for the preparation of a tricarbocyanine iodide which comprises reacting together two molecules of a quaternary salt of the following structure:

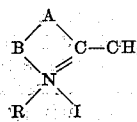

wherein R represents an alkyl group, R' represents a substituent selected from the group consisting of a hydrogen atom and an alkyl group, A represents an atom selected from the group sulfur and selenium and B represents a radical selected from the group consisting of an ethylene, a phenylene and a naphthylene, with pyridine in the presence of a quaternary salt of the following structure:

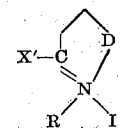

wherein R represents an alkyl group and D represents a radical selected from the group consisting of a vinylene and a phenylene and X' represents a halogen atom.

3. A process for the preparation of a tricarbocyanine iodide which comprises reacting together two molecules of a quaternary salt of the following structure:

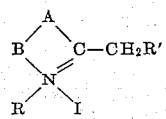

wherein R represents an alkyl group, R' represents a substituent selected from the group consisting of a hydrogen atom and an alkyl group, A represents an atom selected from the group sulfur and selenium, and B represents a radical selected from the group consisting of an ethylene, a phenylene and a naphthylene, with pyridine in the presence of a quaternary salt of the following structure:

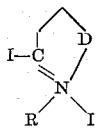

wherein R represents an alkyl group and D represents a radical selected from the group consisting of a vinylene and a phenylene.

4. A process for the preparation of a tricarbocyanine iodide which comprises reacting together two molecules of a quaternary salt of the following structure:

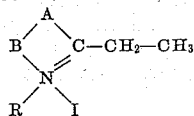

wherein R represents an alkyl group, A represents an atom selected from the group consisting of sulfur and selenium and B represents a radical selected from the group consisting of an ethylene, a phenylene and a naphthylene, with pyridine in the presence of a quaternary salt of the following structure:

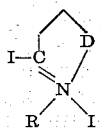

wherein R represents an alkyl group and D represents a radical selected from the group consisting of a vinylene and a phenylene.

5. A process for the preparation of a tricarbocyanine iodide which comprises reacting together two molecules of a quaternary salt of the following structure:

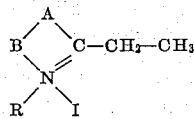

wherein R represents an alkyl group, A represents an atom selected from the group consisting of sulfur and selenium and B represents a radical selected from the group consisting of an ethylene, a phenylene and a naphthylene, with pyridine in the presence of an alkiodide of 2-iodopyridine.

6. A process for the preparation of a tricarbocyanine iodide which comprises reacting together two molecules of a quaternary salt of the following structure:

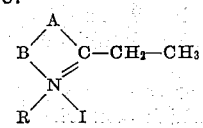

wherein R represents an alkyl group, A represents an atom selected from the group consisting of sulfur and selenium and B represents a radical selected from the group consisting of an ethylene, a phenylene and a naphthylene, with pyridine in the presence of an alkiodide of 2-iodoquinoline.

7. A process for the preparation of a tricarbocyanine iodide which comprises reacting together two molecules of a quaternary salt of the following structure:

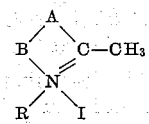

wherein R represents an alkyl group, A represents an atom selected from the group consisting of sulfur and selenium and B represents a radical selected from the group consisting of an ethylene, a phenylene and a naphthylene, with pyridine in the presence of a quaternary salt of the following structure:

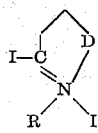

wherein R represents an alkyl group and D represents a substituent selected from the group consisting of vinylene and phenylene.

8. A process for the preparation of a tricarbocyanine iodide which comprises reacting together two molecules of a quaternary salt of the following structure:

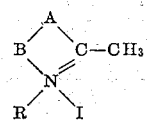

wherein R represents an alkyl group, A represents an atom selected from the group consisting of sulfur and selenium and B represents a radical selected from the group consisting of an ethylene, a phenylene and a naphthylene, with pyridine in the presence of an alkiodide of 2-iodopyridine.

9. A process for the preparation of a tricarbocyanine iodide which comprises reacting together two molecules of a quaternary salt of the following structure:

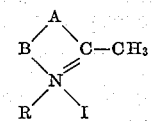

wherein R represents an alkyl group, A represents an atom selected from the group consisting of sulfur and selenium and B represents a substituent selected from the group consisting of ethylene, phenylene and naphthylene, with pyridine in the presence of an ethiodide of 2-iodoquinoline.

10. A process for the preparation of a tricarbocyanine iodide which comprises reacting together two molecules of a quaternary salt of the following structure:

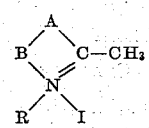

wherein R represents an alkyl group, A represents an atom selected from the group consisting of sulfur and selenium and B represents a radical selected from the group consisting of an ethylene, a phenylene and a naphthylene, with pyridine in the presence of an ethiodide of 2-iodopyridine.

11. A process for the preparation of a tricarbocyanine iodide which comprises reacting together two molecules of an alkyl quaternary salt of 1-methylbenzothiazole, with pyridine in the presence of an alkiodide of 2-iodoquinoline.

12. A process for the preparation of a tricarbocyanine iodide which comprises reacting together two molecules of an alkyl quaternary salt of 1-methylbenzothiazole, with pyridine in the presence of an ethiodide of 2-iodoquinoline.

13. A process for the preparation of a tricarbocyanine iodide which comprises reacting together two molecules of an alkyl quaternary salt of 1-methylbenzothiazole, with pyridine in the presence of an alkiodide of 2-iodopyridine.

14. A process for the preparation of a tricarbocyanine iodide which comprises reacting together two molecules of an alkyl quaternary salt of 1-methylbenzothiazole, with pyridine in the presence of ethiodide of 2-iodopyridine.

15. A 7,13-dialkyl-2,2'-dialkylthiotricarbocyanine salt.

16. A 7,13-dimethyl-2,2'-dialkylthiotricarbocyanine salt.

17. A 7,13-dialkyl-2,2'-dialkylthiotricarbocyanine iodide.

18. A 7,13-dimethyl-2,2'-dialkylthiotricarbocyanine iodide.

19. A 7,13-dimethyl-2,2'-diethylthiotricarbocyanine iodide.

LESLIE G. S. BROOKER.